(12) United States Patent
Fukushima et al.

(10) Patent No.: US 10,410,769 B2
(45) Date of Patent: Sep. 10, 2019

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Seishi Kimura, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/232,760

(22) Filed: Dec. 26, 2018

(65) Prior Publication Data
US 2019/0206593 A1 Jul. 4, 2019

(30) Foreign Application Priority Data
Dec. 28, 2017 (JP) ................................ 2017-254092

(51) Int. Cl.
*H01B 17/16* (2006.01)
*H01R 9/22* (2006.01)
(Continued)

(52) U.S. Cl.
CPC ............ *H01B 17/16* (2013.01); *H01M 2/206* (2013.01); *H01R 9/223* (2013.01); *H01M 2220/20* (2013.01); *H01R 4/34* (2013.01)

(58) Field of Classification Search
CPC .. H01M 2/206; H01M 2220/20; H01M 9/223; H01M 4/34; H01M 13/506; H01B 17/16
See application file for complete search history.

(56) References Cited

U.S. PATENT DOCUMENTS

2014/0329136 A1* 11/2014 Kinoshita ........... H01M 2/1077
429/158
2015/0364872 A1* 12/2015 Nakayama ............... H01G 2/04
429/121
(Continued)

FOREIGN PATENT DOCUMENTS

JP 2013-098030 5/2013

*Primary Examiner* — Briggitte R. Hammond
(74) *Attorney, Agent, or Firm* — Greenblum & Bernstein, P.L.C.

(57) ABSTRACT

The present invention provides a connection module that allows miniaturization of a coupling structure for insulating protectors. A connection module includes a plurality of bus bars and a plurality of insulating protectors that insulate and hold the plurality of bus bars. Each of the insulating protectors includes at least one of a lock portion that includes a lock protrusion and that is provided for coupling with an adjacent insulating protector and a guide portion that guides the lock protrusion of the lock portion provided in the adjacent insulating protector such that the lock protrusion is engaged with the guide portion. The lock portion includes a guide receiving portion into which the guide portion is to be inserted, and the guide portion includes a lock engagement portion with which the lock protrusion is to be engaged.

9 Claims, 13 Drawing Sheets

(51) Int. Cl.
*H01M 2/20* (2006.01)
*H01R 4/34* (2006.01)

(56) References Cited

U.S. PATENT DOCUMENTS

2016/0254515 A1* 9/2016 Shimoda ............... H01M 2/206
　　　　　　　　　　　　　　　　　　　　　　429/61
2017/0294640 A1* 10/2017 Fukushima ......... H01M 2/1077

* cited by examiner

[FIG. 8]
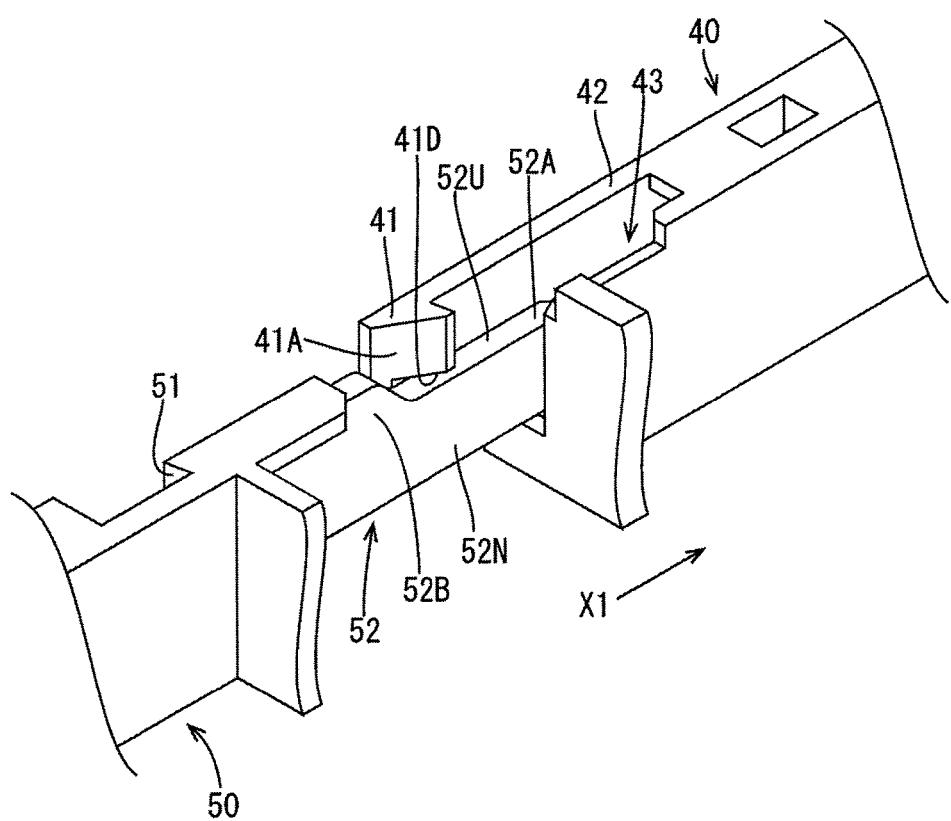

[FIG. 9]
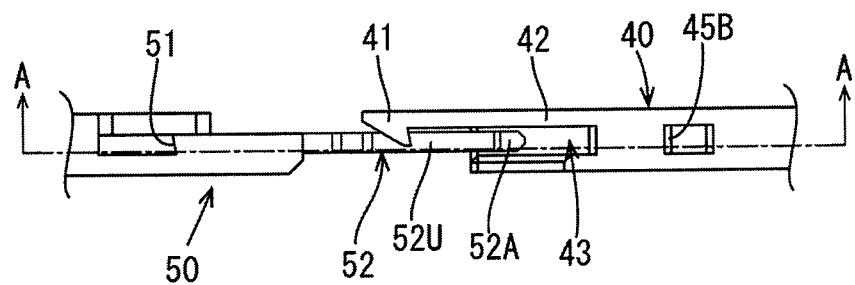
[FIG. 10]
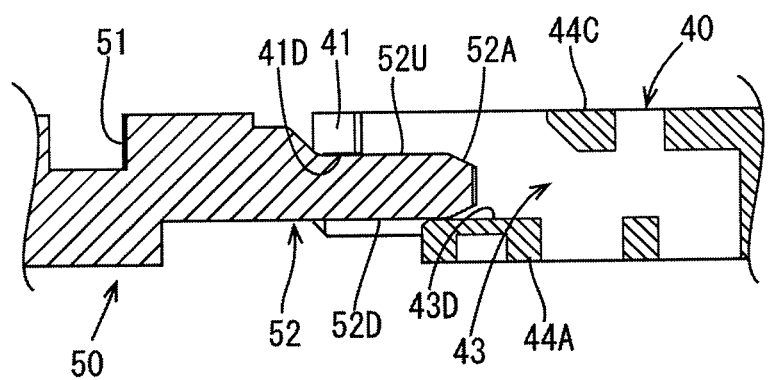

[FIG. 11]
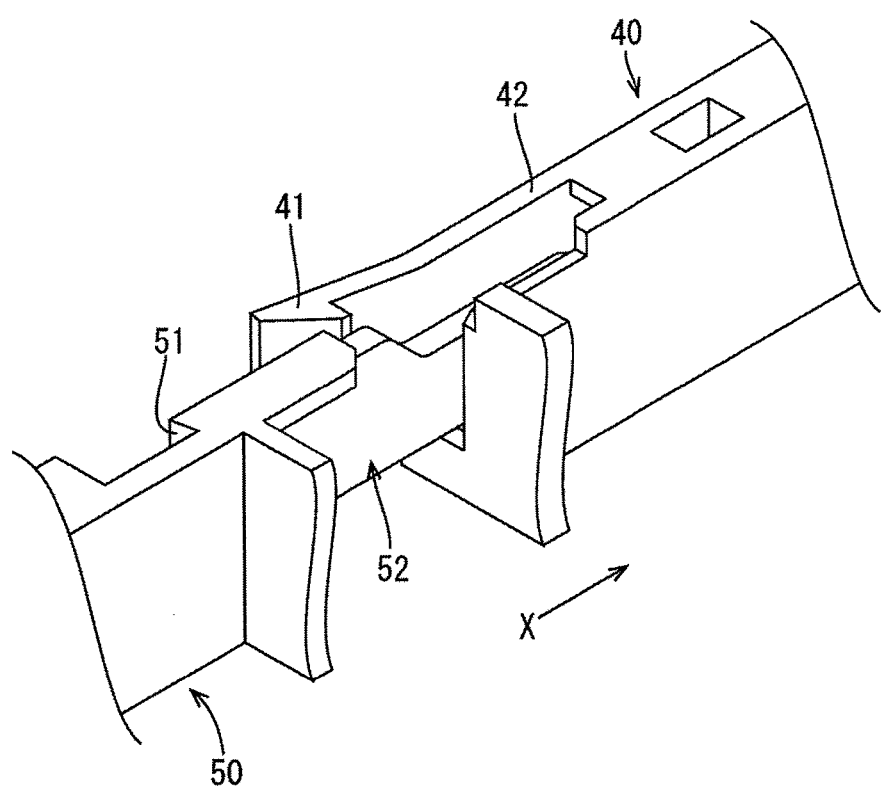

[FIG. 1 2]
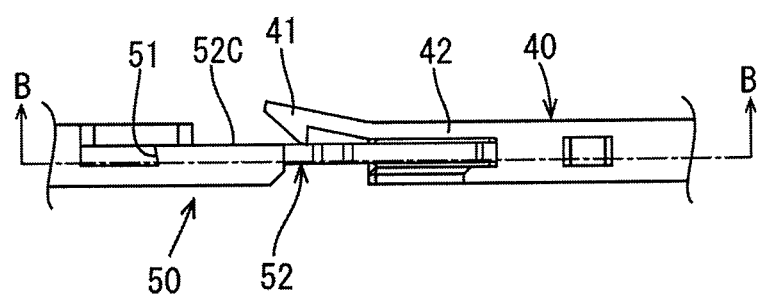
[FIG. 1 3]
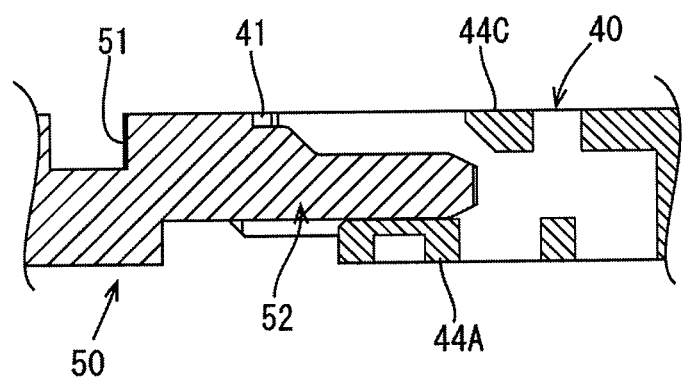

[FIG. 14]
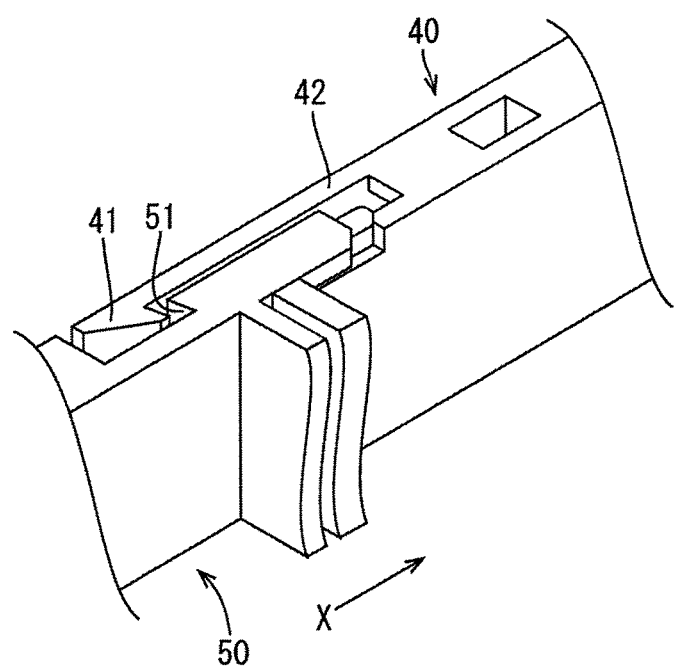

[FIG. 15]
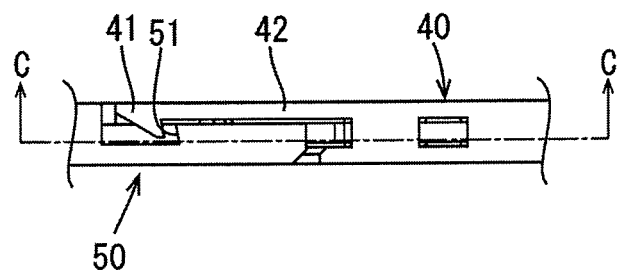
[FIG. 16]
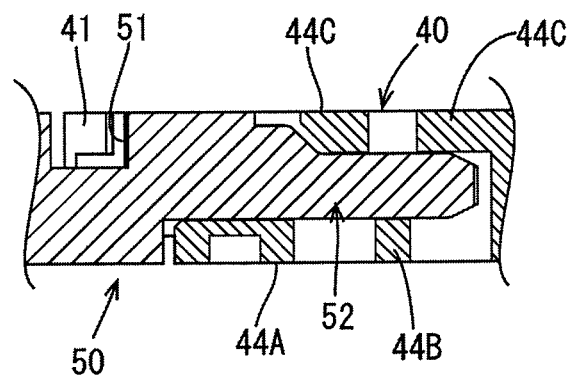

CONNECTION MODULE

TECHNICAL FIELD

The technology disclosed in the present specification relates to a connection module, specifically to a connection module to be attached to a power storage element group composed of a plurality of power storage elements, and more specifically to a coupling structure that is included in the connection module and is adapted to connect insulating protectors that insulate and hold bus bars for connecting electrodes of power storage elements.

BACKGROUND ART

Conventionally, the technology disclosed in JP 2013-98030A is known as an example of the technology relating to a coupling structure for coupling insulating protectors included in the connection module. JP 2013-98030A discloses, as a structure for joining coupling units (corresponding to insulating protectors), a coupling member (26) including: coupling protruding parts (46; 47) that include engaging portions (51; 52); a coupling insertion portion (36) into which the coupling protruding parts (46; 47) are to be inserted; engaged portions (40A; 40B) with which the engaging portions (51; 52) are to be engaged; a guide protruding part (48); a guide receiving portion (41) with which the guide protruding part (48) is to be engaged; and the like. By providing the coupling protruding parts (46; 47) with notch portions (49) that provide a clearance between the coupling protruding parts (46; 47) and the coupling insertion portion (36), flexural deformation in a predetermined range in resin protectors (insulating protectors) (25) is allowed.

JP 2013-98030A is an example of related art.

However, in the coupling structure disclosed in JP 2013-98030A, components pertaining to the coupling protruding parts (46; 47), namely, the coupling protruding parts (46; 47), the coupling insertion portion (36), and the engaged portions (40A; 40B), and components pertaining to the guide protruding part (48), namely, the guide protruding part (48) and the guide receiving portion (41) are provided as separate components. Accordingly, it cannot necessarily be said that a space occupied by the coupling structure in the insulating protectors is optimized.

The technology disclosed in the present specification was achieved in light of the foregoing situation and provides a connection module that allows miniaturization of a coupling structure for insulating protectors.

SUMMARY OF THE INVENTION

The connection module disclosed in the present specification is a connection module to be attached to a power storage element group composed of a plurality of power storage elements having positive and negative electrode terminals, including: a plurality of bus bars connecting the positive electrode terminals and the negative electrode terminals of the power storage elements that are adjacent to each other, and a plurality of insulating protectors that insulate and hold the plurality of bus bars, wherein each of the insulating protectors includes at least one of a lock portion that includes a lock protrusion and that is provided for coupling with an adjacent insulating protector and a guide portion for guiding the lock protrusion of the lock portion provided in the adjacent insulating protector such that the lock protrusion is engaged with the guide portion, the lock portion includes a guide receiving portion into which the guide portion is to be inserted, and the guide portion includes a lock engagement portion with which the lock protrusion is to be engaged.

According to this configuration, in the coupling structure for the insulating protectors, including the lock portion and the guide portion that guides the lock portion, the lock portion includes the lock protrusion and the guide receiving portion into which the guide portion is to be inserted, and the guide portion includes the lock engagement portion with which the lock protrusion is to be engaged. Thus, the coupling structure for the insulating protectors can be composed of only two separate components, namely, the lock portion and the guide portion. This allows miniaturization of the coupling structure for the insulating protectors.

The connection module may be configured such that the guide portion includes a guide protruding part that protrudes and is to be inserted into the guide receiving portion, and the guide protruding part includes a narrow portion that has a narrow protruding part width and that prevents the lock protrusion and the guide protruding part from interfering with each other before the guide protruding part reaches the guide receiving portion.

According to this configuration, it is possible to prevent the lock protrusion and the guide protruding part from interfering with each other before the guide protruding part reaches the guide receiving portion. Furthermore, the lock protrusion can be engaged with the lock engagement portion with the guide protruding part being held in the guide receiving portion. Therefore, an operation of engaging the lock protrusion with the lock engagement portion can be performed stably. In other words, it is possible to improve the guide function of the guide portion.

Also, the connection module may be configured such that the lock protrusion has a first contact surface to be in contact with the narrow portion, and the narrow portion has a first positioning end face that, by coming into contact with the first contact surface when the guide protruding part is inserted into the guide receiving portion, performs positioning in one direction perpendicular to a protruding direction of the guide protruding part.

According to this configuration, when the first positioning end face of the narrow portion comes into contact with the first contact surface of the lock protrusion, positioning in one direction (upward direction) perpendicular to the protruding direction of the guide protruding part can be achieved.

Also, the connection module may be configured such that the guide receiving portion includes a second contact surface, and the narrow portion has a second positioning end face that, by coming into contact with the second contact surface after the first positioning end face comes into contact with the first contact surface when the guide protruding part is inserted into the guide receiving portion, performs positioning in a direction opposite to the one direction perpendicular to the protruding direction.

According to this configuration, when the second positioning end face of the narrow portion (guide protruding part) comes into contact with the second contact surface (bottom surface) of the guide receiving portion, positioning in a direction (downward direction) opposite to the one direction perpendicular to the protruding direction can be achieved. As a result, it is possible to perform positioning in both of the directions (upward and downward directions) perpendicular to the protruding direction.

Also, the connection module may be configured such that the lock portion includes a lock arm that constitutes part of the guide receiving portion, the lock protrusion is formed in one end portion in a width direction of the lock arm in a leading end portion of the lock arm, and the lock engagement portion is disposed on a rear side of the guide protruding part, which is a side opposite to a side toward which the guide protruding part protrudes.

According to this configuration, the lock engagement portion and the guide protruding part in the guide portion are disposed in tandem, and therefore, the guide portion can be made long. Accordingly, when the guide protruding part is inserted into the guide receiving portion, the insertion section of the guide protruding part, or in other words, the joint section between the lock portion and the guide portion can be made long. Therefore, as compared with a configuration in which the joint section is short, the stability of the joining between the lock portion and the guide portion, or in other words, the strength of the joining can be improved. As a result, flexure at the coupling portion of the coupled insulating protectors can be reduced.

Also, the connection module may be configured such that the lock portion includes: a wall portion that surrounds the guide receiving portion; three or more die-cut holes formed in the wall portion; three or more parts of the wall portion located at positions opposing the respective die-cut holes; and rotation restricting portions that are constituted by the three or more parts of the wall portion and restrict, in a state where the guide portion is inserted into the guide receiving portion, rotation of the guide portion with a thickness direction of the guide protruding part serving as an axial direction of rotation.

According to this configuration, in the case where the lock portion is formed by injection molding using two molds that are combined from two directions, e.g., upward and downward directions, the rotation restricting portions that restrict rotation of the guide protruding part can be formed effectively.

Furthermore, during movement etc. of the coupled insulating protectors, even if a force causing flexure of the insulating protectors, or in other words, a rotating force is applied to the coupling portion (the lock portion and the guide portion), rotation of the coupling portion is restricted. Accordingly, the flexure of the coupled insulating protectors is suppressed, and an operation of attaching the connection module to the electric storage element group can be performed efficiently.

Also, the connection module may be configured such that each of the insulating protectors includes module outer walls that extend along an alignment direction of the bus bars and that constitute an outer wall of the connection module, and the lock portion and the guide portion are formed on the module outer walls.

According to this configuration, the lock portion and the guide portion are formed on the module outer walls that extend along the alignment direction of the bus bars and that constitute the outer wall of the connection module. That is, the lock portions and the guide portions are formed on the module outer walls located at end portions in the direction perpendicular to the alignment direction of the bus bars in the insulating protector. Thus, for example, in the case where the lock portion and the guide portion are formed on the module outer walls at both of the end portions, at the time of coupling the multiple insulating protectors by the lock portions and the guide portions, flexure of the coupled insulating protectors in the horizontal direction in a plan view (the direction perpendicular to the alignment direction of the bus bars) can be suppressed most effectively.

Also, the connection module may be configured such that each of the insulating protectors has bus bar housing portions that surround and house the bus bars separately, the bus bar housing portions include housing portion outer walls that extend along the alignment direction of the bus bars and constitute the module outer wall, and the lock portion and the guide portion are provided on the housing portion outer walls of the bus bar housing portions that are to be in an adjacent state when two insulating protectors are coupled with each other.

According to this configuration, the lock portion and the guide portion can be formed utilizing the housing portion outer walls of the bus bar housing portions.

Also, the connection module may be configured such that each of the insulating protectors includes an intermediate coupling portion, the bus bar housing portions include a first bus bar housing portion and a second bus bar housing portion that are coupled with each other by the intermediate coupling portion in a direction perpendicular to the alignment direction of the bus bars, and in each of the insulating protectors, at least one of the lock portion and the guide portion is provided on both the housing portion outer wall of the first bus bar housing portion to be in the adjacent state and the housing portion outer wall of the second bus bar housing portion to be in the adjacent state.

According to this configuration, at least one of the lock portion and the guide portion are provided on both the housing portion outer wall of the first bus bar housing portion and the housing portion outer wall of the second bus bar housing portion. Thus, the insulating protectors are coupled with each other at both end portions in the direction perpendicular to the alignment direction of the multiple bus bars. Accordingly, the connection module is compatible with a power storage element group in which bus bars need to be aligned in two rows, and as compared with the case where insulating protectors are coupled with each other at positions inside both of the end portions, flexure of the coupled insulating protectors in the horizontal direction in a plan view (the direction perpendicular to the alignment direction of the bus bars) can be suppressed effectively.

The connection module disclosed in the present specification allows miniaturization of a coupling structure for insulating protectors.

BRIEF DESCRIPTION OF THE DRAWINGS

FIG. 8 is a schematic perspective view showing a joining action of the lock portion and the guide portion.

FIG. 9 is a plan view of FIG. 8.

FIG. 10 is a sectional view taken along line A-A in FIG. 9.

FIG. 11 is a schematic perspective view showing a joining action of the lock portion and the guide portion.

FIG. 12 is a plan view of FIG. 11.

FIG. 13 is a sectional view taken along line B-B in FIG. 12.

FIG. 14 is a schematic perspective view showing a joining action of the lock portion and the guide portion.

FIG. 15 is a plan view of FIG. 14.
FIG. 16 is a sectional view taken along line C-C in FIG. 15.

EMBODIMENTS OF THE INVENTION

Embodiment

Figure 1:
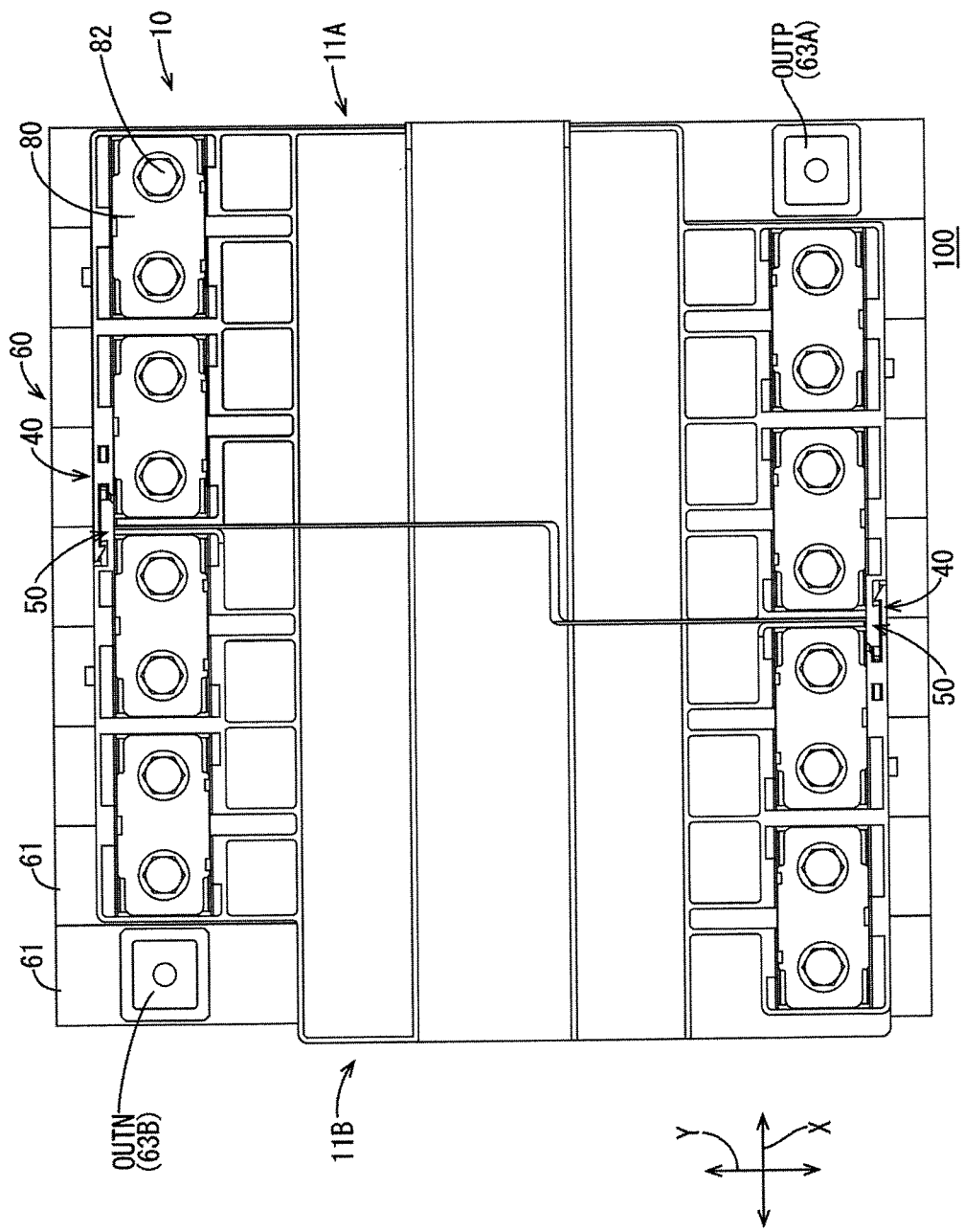
FIG. 1 is a plan view of a power storage module including a connection module according to one embodiment.
Figure 2:
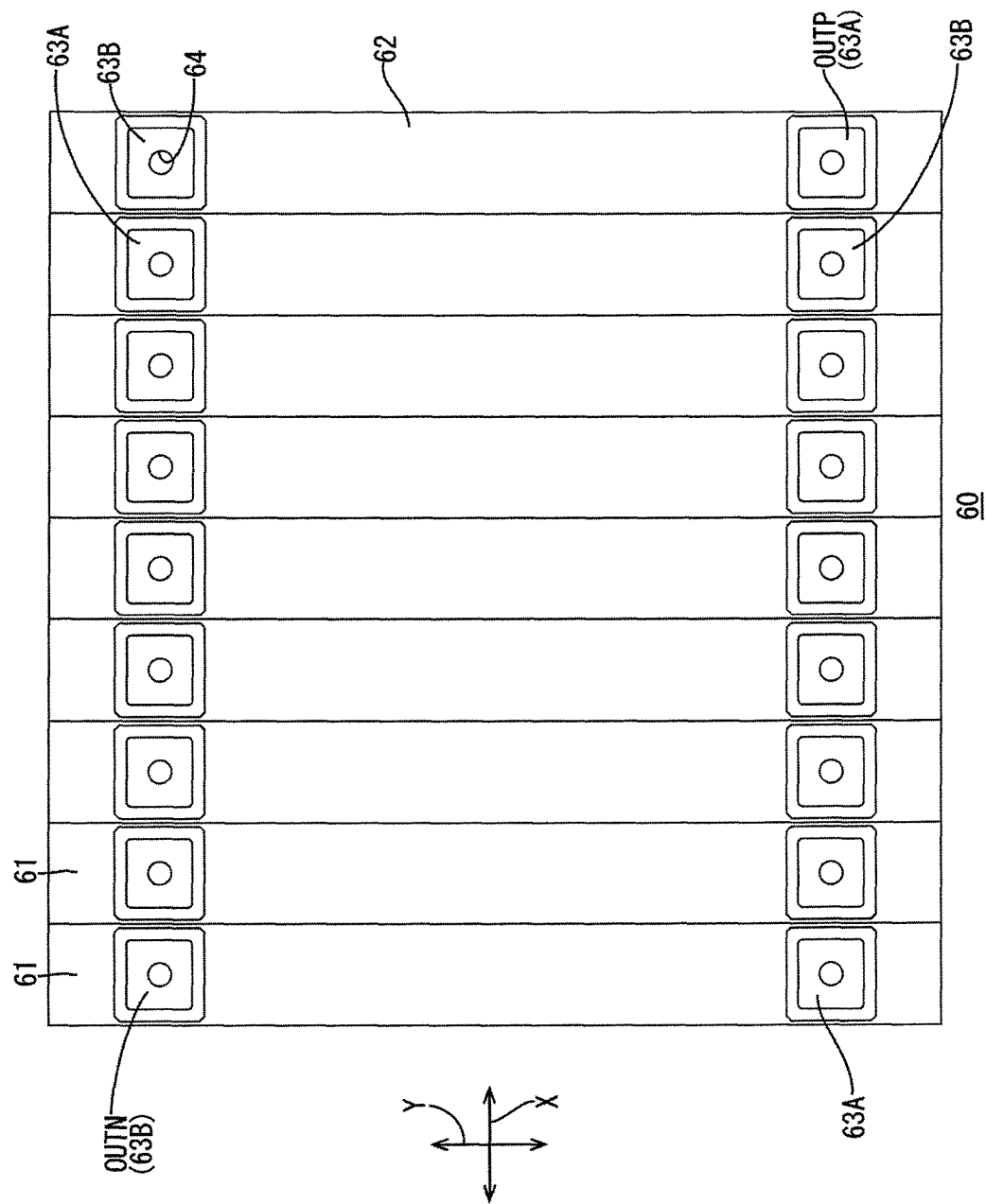
FIG. 2 is a plan view of the power storage element group.

An embodiment of the present invention will be described with reference to FIGS. 1 to 16. In the following description, the direction indicated with arrow X in FIGS. 1 and 2 is considered to be an alignment direction of power storage elements, and the direction indicated with arrow Y in FIGS. 1 and 2 is considered to be a direction perpendicular to the alignment direction of the power storage elements (the longitudinal direction of the power storage elements). For a plurality of identical members, a reference numeral may be assigned to one member, and reference numerals may be omitted for the other members.

A power storage module 100 shown in the present embodiment is mounted in a vehicle (not shown) such as an electric automobile or a hybrid automobile, and is used as a power source for driving the vehicle.

1. Configuration of Power Storage Module

As shown in FIGS. 1 and 2, the power storage module 100 of the present embodiment is mainly constituted by a power storage element group 60 (see FIG. 2) constituted by aligning multiple (nine in the present embodiment) power storage elements 61, and a connection module 10 attached to the power storage element group 60. Hereinafter, the power storage element group 60 will be described briefly.

1-1. Power Storage Element Group and Power Storage Elements

The power storage element 61 according to the present embodiment is a secondary battery, for example. As shown in FIG. 2, the multiple power storage elements 61 are aligned in one row in the direction of arrow X to constitute the power storage element group 60.

The power storage elements 61 have flat cuboid-shaped outer shapes, and as shown in FIG. 2, have electrode arrangement surfaces 62 that are perpendicular to the surfaces opposing the adjacent power storage elements 61. A pair of electrode terminals 63 are arranged at positions near both end portions in the lengthwise direction (the direction of arrow Y) on the electrode arrangement surface 62. One of the electrode terminals 63 is a positive electrode terminal 63A and the other is a negative electrode terminal 63B. The electrode terminals 63 are made of metal and protrude in the form of rectangular tubes from the electrode arrangement surface 62. Each electrode terminal 63 is provided with a bolt hole 64 to which a bolt 82 (see FIG. 1) is joined.

The multiple power storage elements 61 are aligned such that electrode terminals 63 with different polarities are adjacent to each other on two adjacent power storage elements 61 (i.e., such that a positive electrode terminal 63A of one power storage element 61 and a negative electrode terminal 63B of another power storage element 61 adjacent thereto are adjacent to each other). Also, as shown in FIG. 2, in the present embodiment, the negative electrode terminal 63B of the power storage element 61 on the left end is a negative electrode output terminal OUTN and the positive electrode terminal 63A of the power storage element 61 on the right end is a positive electrode output terminal OUTP.

2. Configuration of Connection Module

Figure 3:
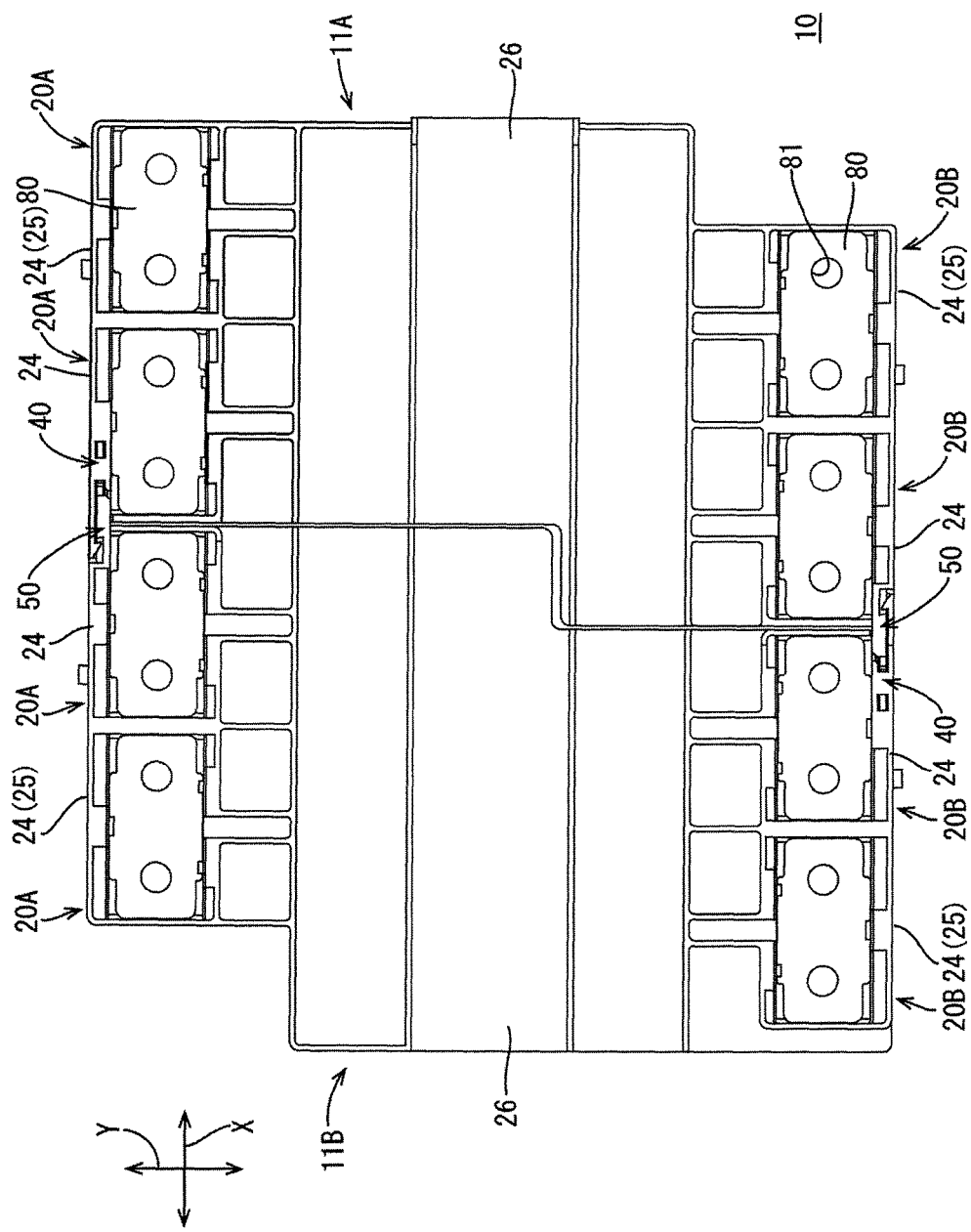
FIG. 3 is a plan view of the connection module.
Figure 4:
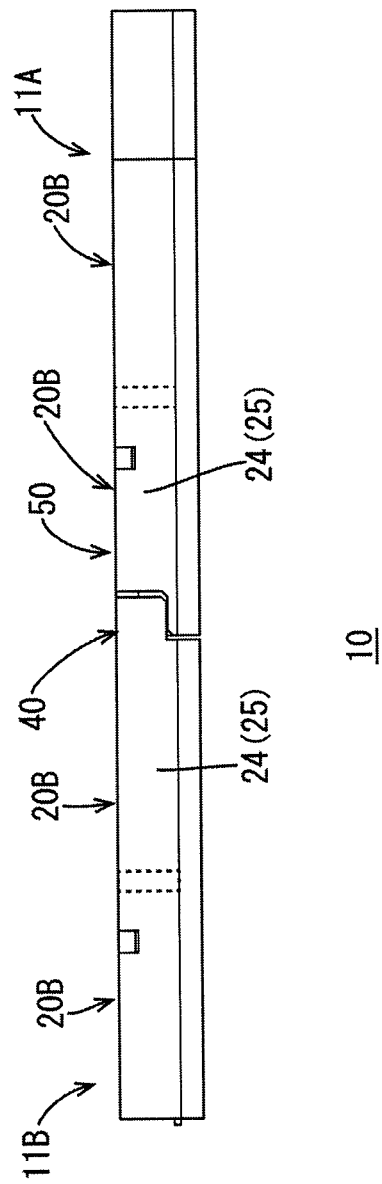
FIG. 4 is a side view of the connection module.

As shown in FIG. 3, the connection module 10 includes multiple bus bars 80 and multiple insulating protectors that insulate and hold the multiple bus bars 80. In the present embodiment, the multiple insulating protectors are constituted by two insulating protectors, namely, a first insulating protector 11A and a second insulating protector 11B. In the following description, when the two insulating protectors (11A, 11B) need not be distinguished from each other, they are denoted simply as "insulating protectors 11".

Each bus bar 80 connects an electrode terminal of a positive electrode (positive electrode terminal) 63A and an electrode terminal of a negative electrode (negative electrode terminal) 63B of adjacent power storage elements 61. The bus bars 80 are formed by punching out metal plates, and as shown in FIG. 3, they are plate-shaped members with approximately rectangular shapes overall, the four corners of which are cut out into flat rectangular shapes. Each bus bar 80 is provided with two connection holes 81 for joining bolts 82 (see FIG. 1) to the bolt holes 64 of the power storage elements 61. Examples of the material of the bus bars 80 include copper, copper alloys, aluminum, aluminum alloys, and stainless steel (SUS).

The insulating protectors 11 are made of synthetic resin, and include multiple (four in the present embodiment) bus bar housing portions 20 that surround the bus bars 80 separately to house them in an insulated state. The insulating protectors 11 include module outer walls 25 that extend along the alignment direction of the bus bars (the direction of arrow X in FIG. 3) and constitute an outer wall of the connection module 10, and lock portions 40 and guide portions 50 to be described below are formed on the module outer walls 25. That is, the lock portions 40 and the guide portions 50 are formed on the module outer walls 25 located at both end portions in the direction (the direction of arrow Y in FIG. 3) perpendicular to the alignment direction of the bus bars in the insulating protectors 11. Accordingly, when the multiple insulating protectors 11 are coupled with each other by the lock portions 40 and the guide portions 50, flexure of the coupled insulating protectors 11 in the horizontal direction in a plan view (the direction perpendicular to the alignment direction of the bus bars: the direction of arrow Y in FIG. 3) can be suppressed most effectively.

The bus bar housing portion 20 includes a housing portion outer wall (24) that extends along the alignment direction of the bus bars (the direction of arrow X in FIG. 3) and constitutes the module outer wall 25. As shown in FIG. 3, the lock portions 40 and the guide portions 50 are provided on the housing portion outer walls 24 of the bus bar housing portions (20A, 20B) to be adjacent to each other when the two insulating protectors (11A, 11B) are coupled with each other. Accordingly, the lock portions 40 and the guide portions 50 can be formed utilizing the housing portion outer walls 24 of the bus bar housing portions (20A, 20B).

Furthermore, as shown in FIG. 3, each insulating protector (11A, 11B) includes an intermediate coupling portion 26. The bus bar housing portions 20 include the first bus bar housing portions 20A and the second bus bar housing portions 20B, which are coupled with each other by the intermediate coupling portion 26 in the direction perpendicular to the alignment direction of the bus bars (the direction of arrow Y in FIG. 3).

In the present embodiment, in the first insulating protector 11A, the lock portion 40 is provided on the housing portion outer wall 24 of the first bus bar housing portion 20A adjacent to the second insulating protector 11B, and the guide portion 50 is provided on the housing portion outer wall 24 of the second bus bar housing portion 20B adjacent to the second insulating protector 11B. On the other hand, in the second insulating protector 11B, contrary to the case of the first insulating protector 11A, the guide portion 50 is provided on the housing portion outer wall 24 of the first bus bar housing portion 20A, and the lock portion 40 is provided on the housing portion outer wall 24 of the second bus bar housing portion 20B.

It is to be noted that there is no limitation thereto. For example, in the first insulating protector 11A, the lock portions 40 may be provided on the housing portion outer walls 24 of the first bus bar housing portion 20A and the second bus bar housing portion 20B, and in the second insulating protector 11B, the guide portions 50 may be provided in the housing portion outer walls 24 of the first bus bar housing portion 20A and the second bus bar housing portion 20B. That is, in each insulating protector (11A, 11B), at least one of the lock portion 40 and the guide portion 50 may be provided on both the housing portion outer walls 24 of the first bus bar housing portion 20A and the second bus bar housing portion 20B to be adjacent to each other.

3. Configuration of Coupling Portion

Figure 5:
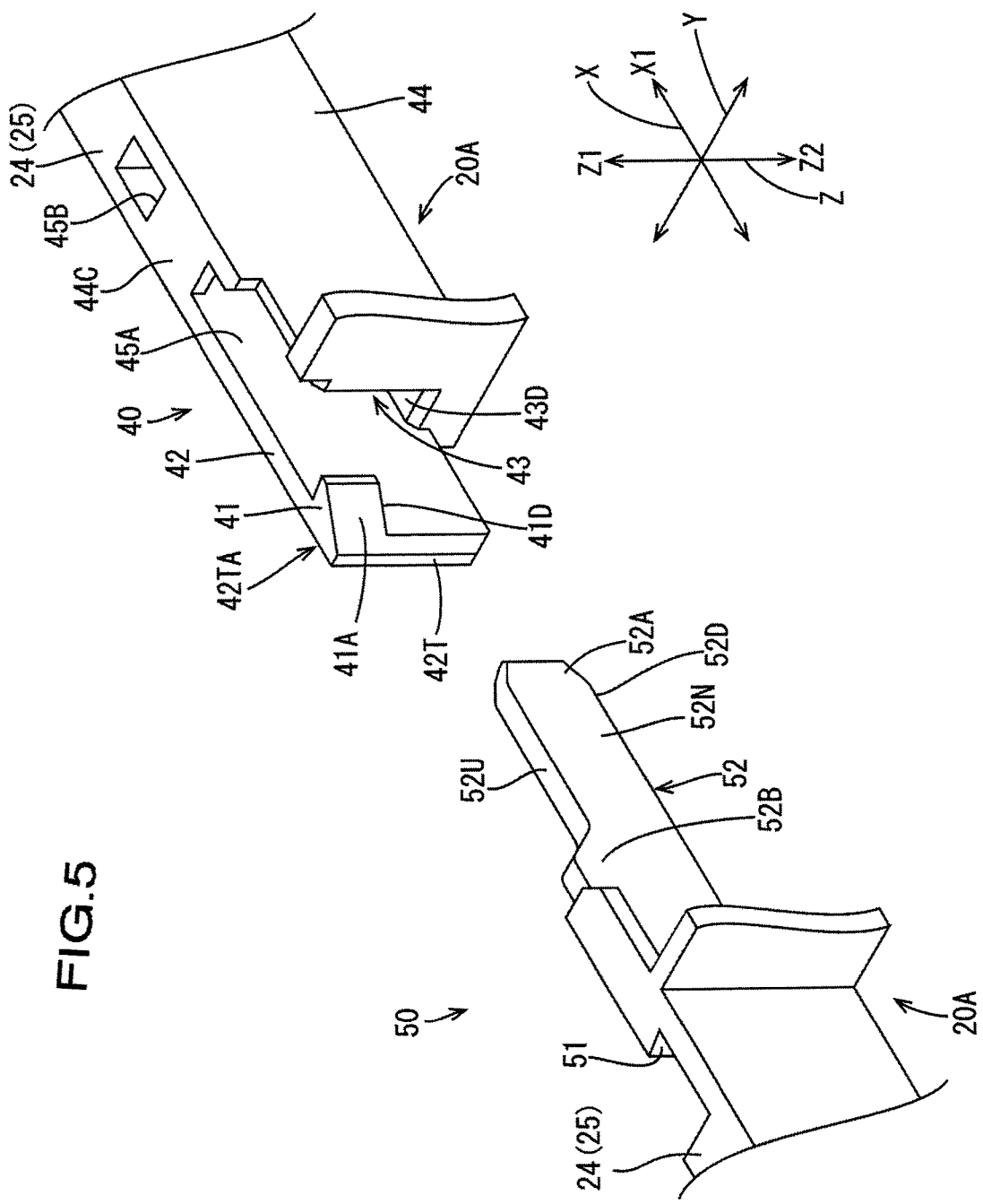
FIG. 5 is a schematic perspective view showing a lock portion and a guide portion

Next, the lock portion 40 and the guide portion 50, which form a coupling portion for coupling adjacent insulating protectors 11, will be described. In FIG. 5, the direction indicated with arrow Z1 is considered to be an upward direction, and the direction indicated with arrow Z2 is considered to be a downward direction.

As shown in FIG. 5, the lock portion 40 and the guide portion 50 are formed integrally with housing portion outer walls 24 of bus housing portions 20 to be adjacent to each other when two insulating protectors (11A, 11B) are coupled with each other. According to this configuration, the lock portion 40 and the guide portion 50 can be formed more compactly.

FIG. 5 shows the lock portion 40 provided on one end of a first bus bar housing portion 20A of the insulating protector 11A and the guide portion 50 provided on one end of a first bus bar housing portion 20A of the second insulating protector 11B. In other words, FIG. 5 shows the lock portion 40 and the guide portion 50 located at a central portion in an upper end portion (an end portion in the direction of arrow Y in FIG. 3) in the connection module 10 shown in FIG. 3 in the state before they are coupled with each other. In FIG. 5, the bus bar housing portions 20 are shown only partially.

3-1. Lock Portion

As shown in FIG. 5, the lock portion 40 includes a lock protrusion 41, a lock arm 42, and a guide receiving portion 43.

The lock protrusion 41 is engaged with a lock engagement portion 51 (to be described below) of the guide portion 50 and thus couples the first insulating protector 11A and the second insulating protector 11B that are adjacent to each other. As shown in FIG. 5, the lock protrusion 41 has a hook-like shape with a tapered surface 41A, and in a leading end portion 42T of the lock arm 42, the lock protrusion 41 is formed on one end 42TA in the width direction (the direction of arrow Z in FIG. 5) of the lock arm 42.

The lock protrusion 41 has a lower surface (corresponding to "first contact surface") 41D to be in contact with an upper surface 52U of a narrow portion 52N of a guide protruding part 52 to be described below. The shape of the lock protrusion 41 and the position at which the lock protrusion 41 is disposed are not limited to those shown in FIG. 5.

The lock arm 42 has an elongated thin plate-like shape, and constitutes part of a guide receiving portion 43 into which the guide portion 50 is inserted.

The guide receiving portion 43 has a contact surface (corresponding to "second contact surface") 43D to be in contact with a lower surface 52D of a narrow portion 52N of the guide protruding part 52 to be described below. The guide receiving portion 43 also includes a space into which the guide protruding part 52 is inserted.

Figure 6:
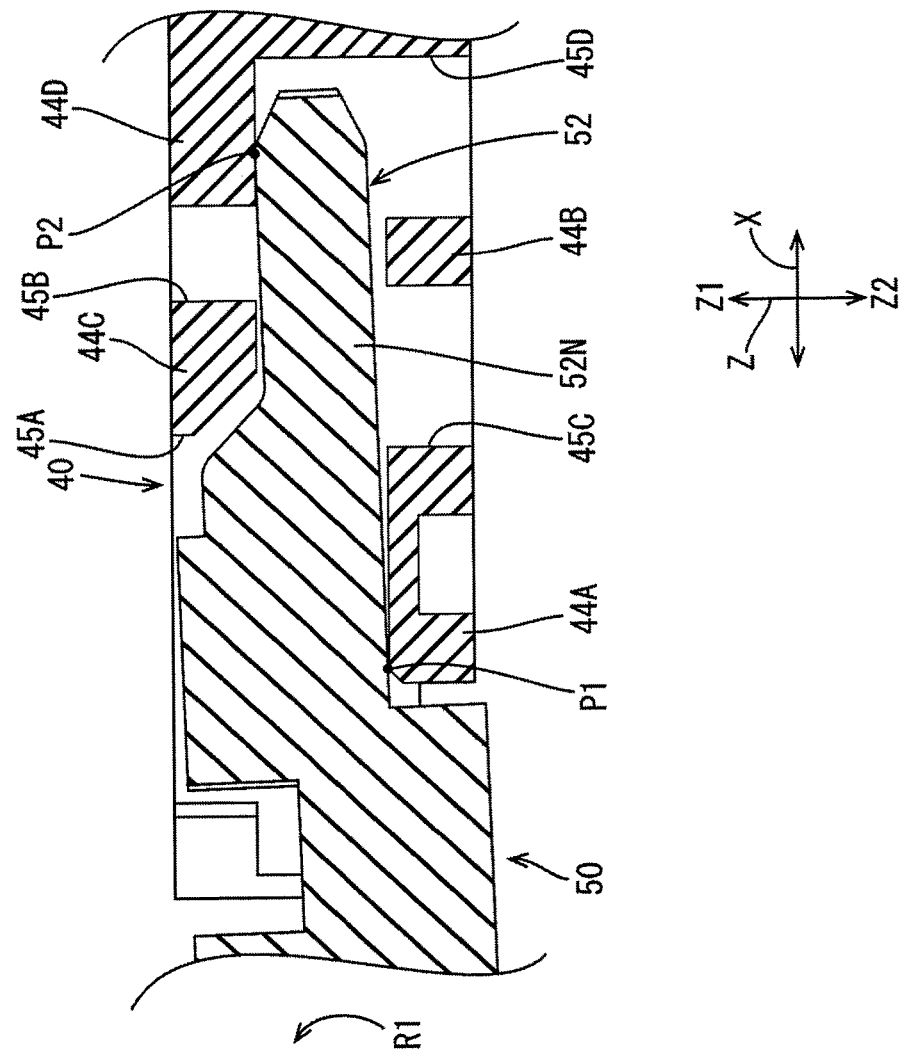
FIG. 6 is a sectional view illustrating rotation restricting portions.
Figure 7:
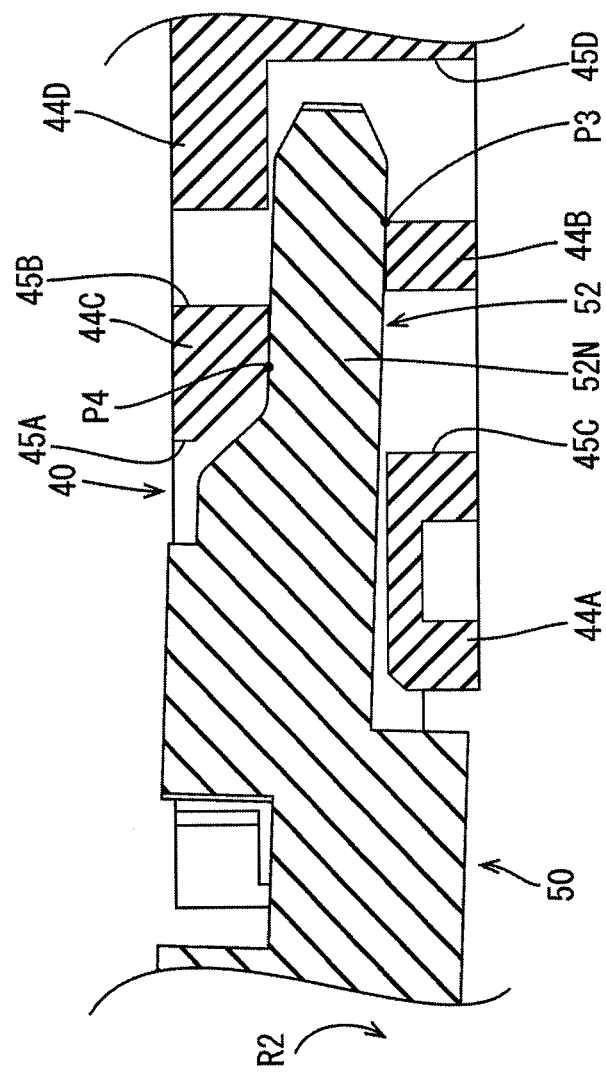
FIG. 7 is a sectional view illustrating the rotation restricting portions.

As shown in FIGS. 6 and 7, the lock portion 40 includes the guide receiving portion 43, and more specifically includes a wall portion 44 surrounding the space in the guide receiving portion 43, three or more (four in the present embodiment) die-cut holes (45A-45D) formed in the wall portion 44, and three or more (four in the present embodiment) parts (44A-44D) of the wall portion located at positions opposing the respective die-cut holes (45A, 45B, 45C, 45D). The four parts (44A, 44B, 44C, 44D) of the wall portion constitute rotation restricting portions that restrict rotation of the guide portion 50 with the thickness direction of the guide protruding part 52 (the direction of arrow Y in FIG. 5) serving as the axial direction of rotation in the state where the guide portion 50 is inserted into the guide receiving portion 43.

According to this configuration, in the case where the lock portion 40 is formed by injection molding using two molds that are combined from two directions, e.g., upward and downward directions (the directions of arrows Z1 and Z2 in FIG. 6), the rotation restricting portions that restrict rotation of the guide protruding part 52 can be formed efficiently and effectively.

In other words, the rotation restricting portions (44A-44D) restrict large movement of the guide protruding part 52 in the vertical direction in FIG. 5 (the direction of arrow Z in FIG. 5) in the state where the first insulating protector 11A and the second insulating protector 11B are coupled with each other by the lock portion 40 and the guide portion 50.

FIG. 6 shows the restricting behaviour of the rotation restricting portions (44A, 44D) when the guide portion 50 rotates counterclockwise (arrow R1). That is, when the guide portion 50 starts to rotate counterclockwise, the guide portion 50 abuts against a site P1 of the rotation restricting portion 44A and a site P2 of the rotation restricting portion 44D. As a result, the counterclockwise rotation of the guide portion 50 with the thickness direction of the guide protruding part 52 (the direction of arrow Y in FIG. 5) serving as the axial direction of rotation is restricted.

On the other hand, FIG. 7 shows the restricting behaviour of the rotation restricting portions (44B, 44C) when the guide portion 50 rotates clockwise (arrow R2). That is, when the guide portion 50 starts to rotate clockwise, the guide portion 50 abuts against a site P3 of the rotation restricting portion 44B and a site P4 of the rotation restricting portion 44C. As a result, clockwise rotation of the guide portion 50 with the thickness direction of the guide protruding part 52 (the direction of arrow Y in FIG. 5) serving as the axial direction of rotation is restricted. The configurations (the number and the shape) of the rotation restricting portions are not limited to those shown in FIGS. 6 and 7.

3-2. Guide Portion

The guide portion 50 guides the lock protrusion 41 of the lock portion 40 provided in an adjacent insulating protector 11 such that the lock protrusion 41 is engaged with the guide portion 50.

As shown in FIG. 5, the guide portion 50 includes the lock engagement portion 51 and the guide protruding part 52 protruding from the lock engagement portion 51. The lock protrusion 41 of the lock portion 40 is engaged with the lock engagement portion 51.

The lock engagement portion 51 is disposed on a rear side of the guide protruding part 52, which is a side opposite to a side toward which the guide protruding part protrudes (the direction of arrow X1 in FIG. 5). That is, the lock engagement portion 51 and the guide protruding part 52 are disposed in tandem, and therefore, the guide portion 50 can be made long. Accordingly, when the guide protruding part 52 is inserted into the guide receiving portion 43, the insertion section of the guide protruding part, or in other words, the joint section between the lock portion 40 and the guide portion 50 can be made long. Therefore, as compared with a configuration in which the joint section is short, the stability of the joining between the lock portion 40 and the guide portion 50, or in other words, the strength of the joining can be improved. As a result, flexure at the coupling portion of the coupled insulating protectors (11A, 11B) can be reduced.

The guide protruding part 52 is inserted into the guide receiving portion 43 of the lock portion 40 and is engaged with the lock portion 40. As shown in FIG. 5, the guide protruding part 52 has an elongated thin plate-like shape, and has a narrower width than the lock arm 42.

The guide protruding part 52 includes a wide portion 52B whose protruding part width, which is a width in the direction (the direction of arrow Z in FIG. 5) that is perpendicular to the protruding direction (direction of arrow X in FIG. 5) and is perpendicular to the thickness direction (direction of arrow Y in FIG. 5), is wide, and a narrow portion 52N having a narrower protruding part width than the wide portion 52B. The narrow portion 52N prevents the lock protrusion 41 and the guide protruding part 52 from interfering with each other before the guide protruding part 52 reaches the guide receiving portion. With this shape, the guide protruding part 52 can guide the lock protrusion 41 along the upper surface 5213 of the guide protruding part 52.

An upper surface (corresponding to "first positioning end face") 52U of the narrow portion 52N performs positioning in one direction (upward direction: direction of arrow Z1 in FIG. 5) perpendicular to the protruding direction of the guide protruding part 52 by coming into contact with the first contact surface 41S when the guide protruding part 52 is inserted into the guide receiving portion 43.

A lower surface (corresponding to "second positioning end face") 52D of the narrow portion 52N performs positioning in a direction (downward direction: direction of arrow Z2 in FIG. 5) opposite to the one direction perpendicular to the protruding direction of the guide protruding part 52 by coming into contact with the second contact surface 43D of the guide receiving portion 43 after the upper surface 52U comes into contact with the first contact surface 41S when the guide protruding part 52 is inserted into the guide receiving portion 43.

The guide protruding part 52 has a length such that, when the guide protruding part 52 is inserted into the guide receiving portion 43, the guide protruding part 52 (in particular, a leading end portion 52A thereof) reaches the guide receiving portion 43 before the lock protrusion 41 is engaged with the lock engagement portion 51. According to this configuration, the lock protrusion 41 can be engaged with the lock engagement portion 51 with the guide protruding part 52 being held in the guide receiving portion 52. Therefore, an operation of engaging the lock protrusion 41 with the lock engagement portion 51 can be performed stably. In other words, it is possible to improve the guide function of the guide portion 50.

4. Joining Actions of Lock Portion and Guide Portion

Hereinafter, the joining actions of the lock portion 40 and the guide portion 50 will be described with reference to FIGS. 8 to 16. In FIGS. 9, 12, and 15, for the sake of convenience in illustration, the lock portion 40 and the guide portion 50 are shown in the state of being separated from the insulating protectors 11.

When the lock portion 40 and the guide portion 50 are joined to each other, first, the leading end portion 52A of the guide protruding part 52 of the guide portion 50 reaches an entrance of the guide receiving portion 43 of the lock portion 40. At this time, the upper surface (first positioning end face) 52U of the narrow portion 52N comes into contact with the lower surface (first contact surface) 41D of the lock protrusion 41, whereby positioning in one direction (upward direction: direction of arrow Z1 in FIG. 5) perpendicular to the protruding direction of the guide protruding part 52 can be achieved (see FIGS. 8 and 10).

Next, when the guide protruding part 52 is inserted in the direction indicated with arrow X1 in FIG. 8, the lower surface (second positioning end face) 52D of the narrow portion 52N (guide protruding part) comes into contact with the bottom surface (second contact surface) 43D of the guide receiving portion, whereby positioning in a direction (downward direction: direction of arrow Z2 in FIG. 5) opposite to the one direction perpendicular to the protruding direction can be achieved (see FIG. 10). As a result, it is possible to perform positioning in both of the directions (upward and downward directions) perpendicular to the protruding direction.

At this time, the lock protrusion 41 moves in a direction opposite to the direction of arrow X1 along the upper surface 52U of the guide protruding part 52, and the tapered surface 41A of the lock protrusion 41 abuts against the wide portion 52B of the guide protruding part 52. This state is shown in FIGS. 8, 9, and 10.

Next, when the guide protruding part 52 is further inserted into the guide receiving portion 43 in the direction indicated with arrow X in FIG. 8, as shown in FIGS. 11, 12, and 13, the lock protrusion 41 is curved toward the direction indicated with arrow Y in FIG. 11 and moves along a wall surface 52C of the guide protruding part 52.

Next, when the guide protruding part 52 is further inserted into the guide receiving portion 43 in the direction indicated with arrow X in FIG. 8, as shown in FIGS. 14, 15, and 16, the lock protrusion 41 is engaged with the lock engagement portion 51 of the guide portion 50. Thus, joining of the lock portion 40 and the guide portion 50 is completed.

5. Effects of Embodiment

In the above embodiment, in the coupling structure for the insulating protectors, including the lock portion 40 and the guide portion 50 that guides the lock portion 40, the lock portion 40 includes the lock protrusion 41 and the guide receiving portion 43 into which the guide portion 50 is to be inserted, and the guide portion 50 includes the lock engagement portion 51 with which the lock protrusion is to be engaged. Thus, the coupling structure for the insulating protectors 11 can be composed of only two separate components, namely, the lock portion 40 and the guide portion 50. This allows miniaturization of the coupling structure for the insulating protectors 11.

In the above-described embodiment, the lock arm 42 and the guide protruding part 52 have elongated thin plate shapes. Accordingly, when the guide protruding part 52 is inserted into the guide receiving portion 43, the insertion section of the guide protruding part 52, or in other words, the joint section between the lock portion 40 and the guide portion 50 can be made long. Therefore, as compared with a configuration in which the joint section is short, the stability of the joining between the lock portion 40 and the guide portion 50, or in other words, the strength of the joining can be improved. Accordingly, at the time of attaching the connection module 10 to the power storage element group 60, it is possible to reduce fluctuation of the coupling portion (the lock portion 40 and the guide portion 50) of the insulating protectors 11, and more specifically, wobbling, flexure, etc. in the directions of arrows Y and Z in FIG. 5. It should be noted that fluctuation in the direction of arrow X in FIG. 5 is allowed within a predetermined range in order to absorb the dimensional tolerance of the power storage elements 61.

In the above embodiment, in the state where the guide portion 50 is inserted into the guide receiving portion 43, i.e., in the state where the insulating protectors (11A, 11B) are coupled with each other by the lock portion 40 and the guide portion 50, rotation of the guide portion 50 with the thickness direction of the guide protruding part 52 serving as the axial direction of rotation is restricted by the rotation restricting portions 44. Accordingly, during movement, an operation of attaching, etc. of the coupled insulating protectors (11A, 11B), even if a force causing flexure of the insulating protectors (11A, 11B), or in other words, a rotating force is applied to the coupling portion (the lock portion 40 and the guide portion 50), rotation of the coupling portions is restricted. Accordingly, the flexure of the coupled insulating protectors (11A, 11B) is suppressed, and it becomes possible to automate an operation of attaching the connection module 10 to the electric storage element group 60. As a result, the efficiency in the attaching operation can be improved.

Other Embodiments

The technology disclosed in the present specification is not intended to be limited to the embodiment described using the above descriptions and drawings, and the technical scope of the present invention also encompasses various embodiments such as the following, for example.

(1) Although the above embodiment is directed to an example where the lock portion 40 and the guide portion 50 are formed integrally with the housing portion outer walls 24, which constitute the module outer wall 25 of the insulating protectors 11 and the outer walls of the bus bar housing portions 20, there is no limitation thereto. For example, the lock portion 40 and the guide portion 50 need not be formed integrally with the housing portion outer walls 24, and the lock portion 40 and the guide portion 50 may be provided on a module outer wall 25 that is provided separately from the housing portion outer walls 24. Furthermore, the lock portion 40 and the guide portion 50 may be provided at positions other than the module outer wall 25. In short, the insulating protectors 11 need only be configured so as to include at least one of the lock portion 40 and the guide portion 50.

(2) Although the lock arm 42 and the guide protruding part 52 have elongated thin plate shapes in the above embodiment, the shapes of the lock arm 42 and the guide protruding part 52 are not limited thereto. For example, the lock arm 42 and the guide protruding part 52 may have thin plate shapes but need not be elongated.

(3) Although the above embodiment is directed to a configuration in which the lock portion 40 includes four die-cut holes (45A-45D) formed in the wall portion 44 and four parts (44A-44D) of the wall portion located at positions opposing the respective die-cut holes (45A-45D) serving as the rotation restricting portions, there is no limitation thereto. For example, the lock portion 40 may include three die-cut holes (45B-45D) and three parts (44B-44D) of the wall portions opposing the die-cut holes. In this case, in FIGS. 6 and 7, by increasing the sizes of the die-cut hole 45B and the part 44B of the wall portion opposing the die-cut hole 45B in the direction of arrow X in FIG. 6, rotation of the guide portion 50 can be restricted even if the die-cut hole 45A and the part 44A of the wall portion are omitted. Accordingly, the lock portion need only be configured such that it includes three or more die-cut holes and three or more parts of the wall portion located at positions opposing the respective die-cut holes.

LIST OF REFERENCE NUMERALS

10: Connection module
11A: First insulating protector (insulating protector)
11B: Second insulating protector (insulating protector)
20: Bus bar housing portion
20A: First bus bar housing portion
20B: Second bus bar housing portion
24: Housing portion outer wall (module outer wall)
25: Module outer wall
40: Lock portion
41: Lock protrusion
41D: Lower surface (first contact surface) of lock protrusion
42: Lock arm
43: Guide receiving portion
43S: Second contact surface
44: Wall portion
44A, 44B, 44C, 44D: Part of wall portion (rotation restricting portion)
45A, 45B, 45C, 45D: Die-cut hole
50: Guide portion
51: Lock engagement portion
52: Guide protruding part
52N: Narrow portion of guide protruding part
52D: Lower surface (second positioning end face) of narrow portion
52U: Upper surface (first positioning end face) of narrow portion
60: Power storage element group
61: Power storage element
63: Electrode terminal
63A: Positive electrode terminal
63B: Negative electrode terminal
80: Bus bar

What is claimed is:

1. A connection module to be attached to a power storage element group composed of a plurality of power storage elements having positive and negative electrode terminals, the connection module comprising:
   a plurality of bus bars connecting the positive electrode terminals and the negative electrode terminals of the power storage elements that are adjacent to each other, and
   a plurality of insulating protectors that insulate and hold the plurality of bus bars,
   wherein each of the insulating protectors includes at least one of a lock portion that includes a lock protrusion and is configured for coupling with an adjacent insulating protector and a guide portion configured to guide the lock protrusion of the lock portion provided on the adjacent insulating protector such that the lock protrusion is engaged with the guide portion,
   the lock portion includes a guide receiving portion into which the guide portion is to be inserted, and
   the guide portion includes a lock engagement portion with which the lock protrusion is to be engaged.

2. The connection module according to claim 1, wherein the guide portion includes a guide protruding part that protrudes and is to be inserted into the guide receiving portion, and the guide protruding part includes a narrow portion that has a narrow protruding part width and that prevents the lock protrusion and the guide protruding part from interfering with each other before the guide protruding part reaches the guide receiving portion.

3. The connection module according to claim 2, wherein
the lock protrusion has a first contact surface to be in contact with the narrow portion, and
the narrow portion has a first positioning end face that comes into contact with the first contact surface when the guide protruding part is inserted into the guide receiving portion, thereby performing positioning in one direction perpendicular to a protruding direction of the guide protruding part.

4. The connection module according to claim 3, wherein
the guide receiving portion includes a second contact surface, and
the narrow portion has a second positioning end face that comes into contact with the second contact surface after the first positioning end face comes into contact with the first contact surface when the guide protruding part is inserted into the guide receiving portion, thereby performing positioning in a direction opposite to the one direction perpendicular to the protruding direction of the guide protruding part.

5. The connection module according to claim 2, wherein
the lock portion includes a lock arm that constitutes part of the guide receiving portion,
the lock protrusion is formed on one end portion in a width direction of the lock arm on a leading end portion of the lock arm, and
the lock engagement portion is disposed on a rear side of the guide protruding part, which is a side opposite to a side toward which the guide protruding part protrudes.

6. The connection module according to claim 2, wherein
the lock portion includes:
a wall portion that surrounds the guide receiving portion;
three or more die-cut holes formed in the wall portion;
three or more parts of the wall portion located at positions opposing the respective die-cut holes; and
rotation restricting portions that are constituted by the three or more parts of the wall portion and restrict, in a condition in which the guide portion is inserted into the guide receiving portion, rotation of the guide portion with a thickness direction of the guide protruding part serving as an axial direction of rotation.

7. The connection module according to claim 1, wherein
each of the insulating protectors includes module outer walls that extend along an alignment direction of the bus bars and that constitute an outer wall of the connection module, and
the lock portion and the guide portion are formed on the module outer walls.

8. The connection module according to claim 7, wherein
each of the insulating protectors has bus bar housing portions that surround and house the bus bars separately,
the bus bar housing portions include housing portion outer walls that extend along the alignment direction of the bus bars and constitute the module outer wall, and
the lock portion and the guide portion are provided on the housing portion outer walls of the bus bar housing portions that are to be in an adjacent condition when two insulating protectors are coupled with each other.

9. The connection module according to claim 8, wherein
each of the insulating protectors includes an intermediate coupling portion,
the bus bar housing portions include a first bus bar housing portion and a second bus bar housing portion that are coupled with each other by the intermediate coupling portion in a direction perpendicular to the alignment direction of the bus bars, and
in each of the insulating protectors, at least one of the lock portion and the guide portion is provided on both the housing portion outer wall of the first bus bar housing portion to be in the adjacent condition and the housing portion outer wall of the second bus bar housing portion to be in the adjacent condition.

* * * * *